United States Patent
Jacobsen et al.

(10) Patent No.: US 12,554,286 B2
(45) Date of Patent: Feb. 17, 2026

(54) HEADSET COMPUTER THAT USES MOTION AND VOICE COMMANDS TO CONTROL INFORMATION DISPLAY AND REMOTE DEVICES

(71) Applicant: Kopin Corporation, Westborough, MA (US)

(72) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 56 days.

(21) Appl. No.: 18/591,586

(22) Filed: Feb. 29, 2024

(65) Prior Publication Data

US 2024/0255991 A1 Aug. 1, 2024

Related U.S. Application Data

(63) Continuation of application No. 17/516,962, filed on Nov. 2, 2021, now Pat. No. 11,947,387, which is a
(Continued)

(51) Int. Cl.
*G06F 1/16* (2006.01)
*G05D 1/00* (2006.01)
(Continued)

(52) U.S. Cl.
CPC .......... *G06F 1/163* (2013.01); *G05D 1/0016* (2013.01); *G05D 1/0038* (2013.01); *G05D 1/223* (2024.01);
(Continued)

(58) Field of Classification Search
CPC .......... G06F 1/163; G06F 3/011; G06F 3/012; G06F 3/0346; G06F 3/167;
(Continued)

(56) References Cited

U.S. PATENT DOCUMENTS

| 4,567,479 A | 1/1986 | Boyd |
| 5,005,213 A | 4/1991 | Hanson et al. |

(Continued)

FOREIGN PATENT DOCUMENTS

| CN | 1335702 A | 2/2002 |
| CN | 1698048 A | 11/2005 |

(Continued)

OTHER PUBLICATIONS

EP 12782481.1, Supplemental European Search Report, "Context Sensitive Overlays in Voice Controlled Headset Computer Displays," dated Sep. 29, 2014.

(Continued)

*Primary Examiner* — Md N Haque
(74) *Attorney, Agent, or Firm* — Hamilton, Brook, Smith & Reynolds, P.C.

(57) ABSTRACT

A wireless hands-free portable headset computer with a micro display arranged near but below a wearer's eye in a peripheral vision area not blocking the wearer's main line of sight. The headset computer can display an image or portions of an image, wherein the portions can be enlarged. The headset computer also can be equipped with peripheral devices, such as light sources and cameras that can emit and detect, respectively, visible light and invisible radiation, such as infrared radiation and ultraviolet radiation. The peripheral devices are controllable by the wearer by voice command or by gesture. The headset computer also can be
(Continued)

broken down into component parts that are attachable to another article worn by an individual, such as a helmet or respirator mask.

20 Claims, 11 Drawing Sheets

Related U.S. Application Data continuation of application No. 16/748,668, filed on Jan. 21, 2020, now Pat. No. 11,237,594, which is a continuation of application No. 13/468,207, filed on May 10, 2012, now Pat. No. 10,627,860.

(60) Provisional application No. 61/484,464, filed on May 10, 2011.

(51) Int. Cl.
  G05D 1/223 (2024.01)
  G05D 1/224 (2024.01)
  G06F 3/01 (2006.01)
  G06F 3/16 (2006.01)
(52) U.S. Cl.
  CPC ............ *G05D 1/224* (2024.01); *G06F 3/011* (2013.01); *G06F 3/012* (2013.01); *G06F 3/167* (2013.01)
(58) Field of Classification Search
  CPC ...... B64C 2201/146; G02B 2027/0138; G02B 2027/014; G02B 2027/0187; G02B 27/017
  See application file for complete search history.

(56) References Cited

U.S. PATENT DOCUMENTS

| | | |
|---|---|---|
| 5,208,449 A | 5/1993 | Eastman |
| 5,594,469 A | 1/1997 | Freeman et al. |
| 5,689,619 A | 11/1997 | Smyth |
| 5,698,834 A | 12/1997 | Worthington |
| 5,742,263 A | 4/1998 | Wang et al. |
| 5,818,455 A | 10/1998 | Stone |
| 5,990,793 A | 11/1999 | Beiback |
| 6,010,216 A | 1/2000 | Jesiek |
| 6,084,556 A | 7/2000 | Zworn |
| 6,108,197 A | 8/2000 | Janik |
| 6,192,343 B1 | 2/2001 | Morgan et al. |
| 6,198,462 B1 | 3/2001 | Daily et al. |
| 6,204,974 B1 | 3/2001 | Spitzer |
| 6,313,864 B1 * | 11/2001 | Tabata ................... H04N 7/147 348/14.05 |
| 6,325,507 B1 | 12/2001 | Jannard et al. |
| 6,346,929 B1 | 2/2002 | Fukushima et al. |
| 6,369,952 B1 | 4/2002 | Rallison |
| 6,408,257 B1 | 6/2002 | Harrington et al. |
| 6,505,055 B1 | 1/2003 | Kahn et al. |
| 6,532,446 B1 | 3/2003 | King |
| 6,538,676 B1 | 3/2003 | Peters et al. |
| 6,741,836 B2 | 5/2004 | Lee et al. |
| 6,778,906 B1 | 8/2004 | Hennings et al. |
| 6,798,391 B2 | 9/2004 | Petersen, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,965,862 B2 | 11/2005 | Schuller |
| 6,966,647 B2 | 11/2005 | Jannard |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,501,995 B2 | 3/2009 | Morita et al. |
| 7,512,414 B2 | 3/2009 | Jannard et al. |
| 7,522,880 B2 | 4/2009 | Stieber et al. |
| 7,620,432 B2 | 11/2009 | Williams |
| 7,620,433 B2 | 11/2009 | Bodylet |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,969,918 B2 | 6/2011 | Takatori et al. |
| 7,976,480 B2 | 7/2011 | Grajales et al. |
| 7,988,283 B2 | 8/2011 | Jannard et al. |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,099,046 B2 | 1/2012 | Helferich |
| 8,108,143 B1 | 1/2012 | Tester |
| 8,123,352 B2 | 2/2012 | Matsumoto et al. |
| 8,140,197 B2 | 3/2012 | Lapidot et al. |
| 8,170,262 B1 | 5/2012 | Liu |
| 8,184,983 B1 | 5/2012 | Ho et al. |
| 8,212,859 B2 | 7/2012 | Tang et al. |
| 8,327,295 B2 | 12/2012 | Ikeda |
| 8,577,427 B2 | 11/2013 | Serota |
| 8,838,075 B2 | 9/2014 | Basir |
| 8,855,719 B2 | 10/2014 | Jacobsen et al. |
| 8,862,186 B2 | 10/2014 | Jacobsen et al. |
| 8,885,719 B2 | 11/2014 | Kondo et al. |
| 8,929,954 B2 | 1/2015 | Jacobsen et al. |
| 9,118,875 B2 | 8/2015 | Ida |
| 9,122,307 B2 | 9/2015 | Jacobsen et al. |
| 9,235,262 B2 | 1/2016 | Jacobsen et al. |
| 9,294,607 B2 | 3/2016 | Jacobson |
| 9,301,085 B2 | 3/2016 | Parkinson et al. |
| 9,316,827 B2 | 4/2016 | Lindley et al. |
| 9,369,760 B2 | 6/2016 | Jacobsen et al. |
| 9,507,772 B2 | 11/2016 | Parkinson et al. |
| 9,817,232 B2 | 11/2017 | Lindley et al. |
| 10,013,976 B2 | 7/2018 | Woodall et al. |
| 10,627,860 B2 | 4/2020 | Jacobsen et al. |
| 11,237,594 B2 | 2/2022 | Jacobsen |
| 11,947,387 B2 | 4/2024 | Jacobsen et al. |
| 2001/0003712 A1 | 6/2001 | Roelofs |
| 2001/0035845 A1 | 11/2001 | Zwern |
| 2002/0015008 A1 | 2/2002 | Kishida et al. |
| 2002/0030649 A1 | 3/2002 | Zavracky et al. |
| 2002/0044152 A1 | 4/2002 | Abbott, III et al. |
| 2002/0065115 A1 | 5/2002 | Lindholm |
| 2002/0094845 A1 | 7/2002 | Inasaka |
| 2002/0130818 A1 | 9/2002 | Viertl |
| 2002/0154070 A1 | 10/2002 | Sato et al. |
| 2002/0158815 A1 | 10/2002 | Zwern |
| 2003/0016253 A1 | 1/2003 | Aoki et al. |

(56) References Cited

U.S. PATENT DOCUMENTS

| | | | |
|---|---|---|---|
| 2003/0035266 A1* | 2/2003 | Ng | G06F 1/163 361/679.03 |
| 2003/0046401 A1 | 3/2003 | Abbott | |
| 2003/0065805 A1 | 4/2003 | Barnes | |
| 2003/0067536 A1 | 4/2003 | Boulanger et al. | |
| 2003/0068057 A1 | 4/2003 | Miller et al. | |
| 2003/0169339 A1 | 9/2003 | Allen et al. | |
| 2003/0222917 A1 | 12/2003 | Trantow | |
| 2004/0100389 A1* | 5/2004 | Naito | H04M 1/05 348/E5.145 |
| 2004/0102957 A1 | 5/2004 | Levin | |
| 2004/0102967 A1 | 5/2004 | Levin | |
| 2004/0113867 A1 | 6/2004 | Tominc | |
| 2004/0189675 A1 | 9/2004 | Pretlove et al. | |
| 2004/0193413 A1 | 9/2004 | Wilson et al. | |
| 2004/0210852 A1 | 10/2004 | Balakrishnan et al. | |
| 2004/0267527 A1 | 12/2004 | Creamer et al. | |
| 2005/0047629 A1 | 3/2005 | Farrell et al. | |
| 2005/0108643 A1 | 5/2005 | Schybergson et al. | |
| 2005/0114140 A1 | 5/2005 | Brackett et al. | |
| 2005/0237296 A1 | 10/2005 | Lee | |
| 2005/0245292 A1 | 11/2005 | Bennett et al. | |
| 2005/0261890 A1 | 11/2005 | Robinson | |
| 2005/0264527 A1 | 12/2005 | Lin | |
| 2006/0007056 A1 | 1/2006 | Ou | |
| 2006/0010368 A1 | 1/2006 | Kashi | |
| 2006/0012884 A1 | 1/2006 | Snorteland et al. | |
| 2006/0028400 A1 | 2/2006 | Lapstun et al. | |
| 2006/0061544 A1 | 3/2006 | Min et al. | |
| 2006/0061551 A1 | 3/2006 | Fateh | |
| 2006/0074624 A1 | 4/2006 | Sahashi | |
| 2006/0109234 A1 | 5/2006 | Hong et al. | |
| 2006/0109237 A1 | 5/2006 | Morita et al. | |
| 2006/0132382 A1 | 6/2006 | Jannard | |
| 2006/0166705 A1 | 7/2006 | Seshadri et al. | |
| 2006/0178085 A1 | 8/2006 | Sotercanos | |
| 2006/0221266 A1 | 10/2006 | Kato et al. | |
| 2006/0238877 A1 | 10/2006 | Ashkenazi et al. | |
| 2007/0009125 A1 | 1/2007 | Frerking et al. | |
| 2007/0030174 A1 | 2/2007 | Randazzo et al. | |
| 2007/0030259 A1 | 2/2007 | Karttunen | |
| 2007/0053544 A1 | 3/2007 | Jhao et al. | |
| 2007/0093279 A1 | 4/2007 | Janik | |
| 2007/0103388 A1 | 5/2007 | Spitzer | |
| 2007/0121423 A1 | 5/2007 | Rioux | |
| 2007/0180979 A1 | 8/2007 | Rosenberg | |
| 2007/0220108 A1 | 9/2007 | Whitaker | |
| 2007/0238475 A1 | 10/2007 | Goedken | |
| 2007/0265495 A1 | 11/2007 | Vayser | |
| 2007/0291974 A1 | 12/2007 | Eisenbraun | |
| 2008/0027591 A1 | 1/2008 | Lenser et al. | |
| 2008/0052643 A1 | 2/2008 | Ike et al. | |
| 2008/0055194 A1 | 3/2008 | Baudino et al. | |
| 2008/0084992 A1 | 4/2008 | Peddireddy et al. | |
| 2008/0120141 A1 | 5/2008 | Kariathungal et al. | |
| 2008/0144854 A1 | 6/2008 | Abreu | |
| 2008/0154613 A1 | 6/2008 | Haulick | |
| 2008/0169998 A1* | 7/2008 | Jacobsen | G02B 27/0172 345/8 |
| 2008/0180640 A1 | 7/2008 | Ito | |
| 2008/0198324 A1 | 8/2008 | Fuziak | |
| 2008/0200774 A1 | 8/2008 | Luo | |
| 2008/0201634 A1 | 8/2008 | Gibb et al. | |
| 2008/0211768 A1 | 9/2008 | Breen et al. | |
| 2008/0239080 A1 | 10/2008 | Moscato | |
| 2009/0002640 A1 | 1/2009 | Yang et al. | |
| 2009/0018419 A1 | 1/2009 | Torch | |
| 2009/0073386 A1* | 3/2009 | Petito | A61B 3/0025 351/243 |
| 2009/0079839 A1 | 3/2009 | Fischer et al. | |
| 2009/0093304 A1 | 4/2009 | Ohta | |
| 2009/0099836 A1 | 4/2009 | Jacobsen et al. | |
| 2009/0117890 A1 | 5/2009 | Jacobsen | |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2009/0182562 A1 | 7/2009 | Claire et al. | |
| 2009/0204410 A1 | 8/2009 | Mozer et al. | |
| 2009/0213071 A1 | 8/2009 | Wang et al. | |
| 2009/0240488 A1 | 9/2009 | White | |
| 2009/0244048 A1 | 10/2009 | Yamanaka | |
| 2009/0251409 A1* | 10/2009 | Parkinson | G02B 27/017 370/401 |
| 2009/0318163 A1 | 12/2009 | George | |
| 2010/0001699 A1 | 1/2010 | Dragojevic | |
| 2010/0020229 A1 | 1/2010 | Hershey et al. | |
| 2010/0033830 A1 | 2/2010 | Yung | |
| 2010/0041447 A1 | 2/2010 | Graylin | |
| 2010/0053069 A1 | 3/2010 | Tricoukes et al. | |
| 2010/0073201 A1 | 3/2010 | Holcomb et al. | |
| 2010/0106497 A1 | 4/2010 | Phillips | |
| 2010/0117930 A1 | 5/2010 | Bacabara et al. | |
| 2010/0119052 A1 | 5/2010 | Kambli | |
| 2010/0121480 A1 | 5/2010 | Stelzer et al. | |
| 2010/0128626 A1 | 5/2010 | Anderson | |
| 2010/0141554 A1 | 6/2010 | Devereaux et al. | |
| 2010/0156812 A1 | 6/2010 | Stallings et al. | |
| 2010/0164990 A1 | 7/2010 | Van Doorn | |
| 2010/0169073 A1 | 7/2010 | Almagro | |
| 2010/0171680 A1 | 7/2010 | Lapidot et al. | |
| 2010/0182137 A1 | 7/2010 | Pryor | |
| 2010/0204981 A1 | 8/2010 | Ribeiro | |
| 2010/0225734 A1 | 9/2010 | Weller | |
| 2010/0235161 A1 | 9/2010 | Kim et al. | |
| 2010/0238184 A1 | 9/2010 | Janicki | |
| 2010/0238396 A1 | 9/2010 | Jannard | |
| 2010/0245585 A1 | 9/2010 | Fisher et al. | |
| 2010/0250231 A1 | 9/2010 | Almagro | |
| 2010/0271587 A1 | 10/2010 | Pavlopoulos | |
| 2010/0277563 A1 | 11/2010 | Gupta et al. | |
| 2010/0289817 A1 | 11/2010 | Meier et al. | |
| 2010/0290127 A1* | 11/2010 | Kessler | G02B 27/0172 359/631 |
| 2010/0295772 A1 | 11/2010 | Alameh et al. | |
| 2010/0302137 A1 | 12/2010 | Benko et al. | |
| 2010/0302282 A1 | 12/2010 | Dobbie et al. | |
| 2010/0306711 A1 | 12/2010 | Kahn et al. | |
| 2010/0309295 A1 | 12/2010 | Chow | |
| 2010/0315329 A1* | 12/2010 | Previc | G06F 3/038 704/275 |
| 2011/0001699 A1 | 1/2011 | Jacobsen et al. | |
| 2011/0089207 A1 | 4/2011 | Tricoukes et al. | |
| 2011/0090135 A1 | 4/2011 | Tricoukes et al. | |
| 2011/0092157 A1 | 4/2011 | Clark et al. | |
| 2011/0092825 A1 | 4/2011 | Gopinathan et al. | |
| 2011/0134910 A1 | 6/2011 | Chao-Suren et al. | |
| 2011/0187640 A1 | 8/2011 | Jacobsen | |
| 2011/0214082 A1 | 9/2011 | Osterhout et al. | |
| 2011/0221656 A1 | 9/2011 | Haddick et al. | |
| 2011/0221669 A1 | 9/2011 | Shams et al. | |
| 2011/0221671 A1 | 9/2011 | King, III et al. | |
| 2011/0227812 A1 | 9/2011 | Haddick et al. | |
| 2011/0227813 A1 | 9/2011 | Haddick et al. | |
| 2011/0238405 A1 | 9/2011 | Pedre | |
| 2011/0248904 A1 | 10/2011 | Miyawaki | |
| 2011/0254698 A1 | 10/2011 | Eberl et al. | |
| 2011/0254865 A1 | 10/2011 | Yee et al. | |
| 2011/0255050 A1 | 10/2011 | Jannard et al. | |
| 2011/0273662 A1 | 11/2011 | Hwang et al. | |
| 2012/0013843 A1 | 1/2012 | Jannard | |
| 2012/0026071 A1 | 2/2012 | Hamdani et al. | |
| 2012/0056846 A1 | 3/2012 | Zaliva | |
| 2012/0062445 A1 | 3/2012 | Haddick et al. | |
| 2012/0068914 A1 | 3/2012 | Jacobsen et al. | |
| 2012/0075177 A1 | 3/2012 | Jacobsen et al. | |
| 2012/0088245 A1 | 4/2012 | Rotter et al. | |
| 2012/0089392 A1 | 4/2012 | Larco et al. | |
| 2012/0092208 A1 | 4/2012 | LeMire et al. | |
| 2012/0105740 A1 | 5/2012 | Jannard | |
| 2012/0110456 A1 | 5/2012 | Larco et al. | |
| 2012/0114131 A1 | 5/2012 | Tricoukes et al. | |
| 2012/0166203 A1 | 6/2012 | Fuchs et al. | |
| 2012/0173100 A1 | 7/2012 | Ellis | |
| 2012/0188245 A1 | 7/2012 | Hyatt | |

(56) References Cited

U.S. PATENT DOCUMENTS

| | | |
|---|---|---|
| 2012/0218303 A1 | 8/2012 | Nakada |
| 2012/0236025 A1 | 9/2012 | Jacobsen et al. |
| 2012/0287284 A1 | 11/2012 | Jacobsen et al. |
| 2012/0302288 A1 | 11/2012 | Born et al. |
| 2013/0019182 A1 | 1/2013 | Gil et al. |
| 2013/0041670 A1 | 2/2013 | Morgan et al. |
| 2013/0070930 A1 | 3/2013 | Johnson |
| 2013/0174205 A1 | 7/2013 | Jacobson |
| 2013/0231937 A1 | 9/2013 | Woodall et al. |
| 2013/0239000 A1 | 9/2013 | Parkinson et al. |
| 2013/0274985 A1 | 10/2013 | Lee et al. |
| 2013/0288753 A1 | 10/2013 | Jacobsen et al. |
| 2013/0289971 A1 | 10/2013 | Parkinson |
| 2013/0290882 A1 | 10/2013 | Cotte |
| 2013/0300649 A1 | 11/2013 | Parkinson et al. |
| 2014/0003616 A1 | 1/2014 | Johnson |
| 2014/0059263 A1 | 2/2014 | Rosenberg et al. |
| 2014/0093103 A1 | 4/2014 | Breece et al. |
| 2014/0111427 A1 | 4/2014 | Lindley et al. |
| 2014/0223299 A1 | 8/2014 | Han |
| 2014/0235169 A1 | 8/2014 | Parkinson et al. |
| 2014/0334644 A1 | 11/2014 | Selig |
| 2014/0368412 A1 | 12/2014 | Jacobsen et al. |
| 2015/0039311 A1 | 2/2015 | Clark et al. |
| 2015/0072672 A1 | 3/2015 | Jacobsen et al. |
| 2015/0279354 A1 | 10/2015 | Gruenstein |
| 2015/0346489 A1 | 12/2015 | Lindley et al. |
| 2018/0277114 A1 | 9/2018 | Woodall et al. |
| 2019/0279636 A1 | 9/2019 | Woodall et al. |
| 2020/0159283 A1 | 5/2020 | Jacobsen et al. |
| 2022/0057831 A1 | 2/2022 | Jacobsen et al. |

FOREIGN PATENT DOCUMENTS

| | | |
|---|---|---|
| CN | 1702607 A | 11/2005 |
| CN | 1735019 A | 2/2006 |
| CN | 1797299 A | 7/2006 |
| CN | 1815437 A | 8/2006 |
| CN | 1828586 A | 9/2006 |
| CN | 1960670 A | 5/2007 |
| CN | 101185016 A | 5/2008 |
| CN | 101196793 A | 6/2008 |
| CN | 101243392 A | 8/2008 |
| CN | 101349944 A | 1/2009 |
| CN | 101444087 A | 5/2009 |
| CN | 101581969 A | 11/2009 |
| CN | 101599267 A | 12/2009 |
| CN | 101620511 A | 1/2010 |
| CN | 201393284 Y | 1/2010 |
| CN | 101706850 A | 5/2010 |
| CN | 101755299 A | 6/2010 |
| CN | 101809651 A | 8/2010 |
| CN | 101986255 A | 3/2011 |
| CN | 102541438 A | 7/2012 |
| CN | 102724353 A | 10/2012 |
| CN | 102736827 A | 10/2012 |
| CN | 102812417 A | 12/2012 |
| CN | 103620527 A | 3/2014 |
| CN | 104981767 A | 10/2015 |
| DE | 103 44 062 | 4/2005 |
| EP | 2 207 164 A2 | 7/2010 |
| EP | 2842055 A1 | 3/2015 |
| EP | 2941690 A1 | 11/2015 |
| JP | 02-084686 | 3/1990 |
| JP | 09-034895 A | 2/1997 |
| JP | 10-020867 A | 1/1998 |
| JP | 2000-215022 A | 8/2000 |
| JP | 2001-100878 A | 4/2001 |
| JP | 2001-506389 A | 5/2001 |
| JP | 2001-202175 A | 7/2001 |
| JP | 2001-216069 A | 8/2001 |
| JP | 2002-525769 A | 8/2002 |
| JP | 2003-241880 | 8/2003 |
| JP | 2004-233117 | 8/2004 |
| JP | 2005-012377 A | 1/2005 |
| JP | 2005-352619 A | 12/2005 |
| JP | 2007-079978 A | 3/2007 |
| JP | 2007-213501 A | 8/2007 |
| JP | 2008-052590 A | 3/2008 |
| JP | 2008-278536 A | 11/2008 |
| JP | 2009-179062 A | 8/2009 |
| JP | 2010-102163 A | 5/2010 |
| JP | 2011-511935 A | 4/2011 |
| JP | 2011-198150 A | 10/2011 |
| JP | 2012-002568 A | 1/2012 |
| JP | 2012-500526 A | 1/2012 |
| JP | 2012-044429 A | 3/2012 |
| JP | 2012-056568 A | 3/2012 |
| JP | 2012-174149 A | 9/2012 |
| JP | 2012-533055 A | 12/2012 |
| JP | 2013-541092 A | 11/2013 |
| JP | 2004-54879 | 2/2014 |
| JP | 2015-515701 A | 5/2015 |
| JP | 2016-508271 A | 3/2016 |
| JP | 2018-032440 A | 3/2018 |
| WO | WO 1995/021408 A1 | 8/1995 |
| WO | WO 1995/023994 A1 | 9/1995 |
| WO | WO 1999/001838 | 1/1999 |
| WO | WO 2000/017848 | 3/2000 |
| WO | WO 2000/079327 | 12/2000 |
| WO | WO 2005/017729 A2 | 2/2005 |
| WO | WO 2006/082764 A1 | 8/2006 |
| WO | WO 2009/017797 A2 | 2/2009 |
| WO | WO 2009/076016 A1 | 6/2009 |
| WO | WO 2009/091639 A1 | 7/2009 |
| WO | WO 2009/120984 A1 | 10/2009 |
| WO | WO 2010/019634 A2 | 2/2010 |
| WO | WO 2010/129679 A1 | 11/2010 |
| WO | WO 2011/004026 A2 | 1/2011 |
| WO | 2011/040262 A1 | 4/2011 |
| WO | WO 2011/051660 A1 | 5/2011 |
| WO | WO 2011/097226 A1 | 8/2011 |
| WO | WO 2011/114149 A1 | 9/2011 |
| WO | WO 2012/025956 A1 | 3/2012 |
| WO | WO 2012/040107 A1 | 3/2012 |
| WO | WO 2012/040386 A1 | 3/2012 |
| WO | WO 2012/154938 A1 | 11/2012 |
| WO | WO 2013/101438 A1 | 7/2013 |
| WO | 2013/163293 A1 | 10/2013 |
| WO | WO 2013/162908 | 10/2013 |
| WO | 2014/107186 A1 | 7/2014 |
| WO | 2014/107410 A1 | 7/2014 |

OTHER PUBLICATIONS

Invitation to Pay Additional Fees received for PCT Patent Application No. PCT/US2012/037284, mailed on Aug. 2, 2012, 2 pages.

International Preliminary Report on Patentability for PCT/US2011/023337 dated Aug. 16, 2012; entitled "Wireless Hands-Free Computing Headset with Detachable Accessories Controllable by Motion, Body Gesture and/or Vocal Commands", 8 pages.

International Preliminary Report on Patentability for PCT/US2012/037284, Headset Computer that Uses Motion and Voices to Control Information Display and Remote Devices, date of mailing: Nov. 21, 2013, 7 pages.

International Preliminary Report on Patentability for PCT/US2013/041070 dated Jul. 16, 2015; entitled "Context Sensitive Overlays in Voice Controlled Headset Computer Displays".

International Search Report and Written Opinion for PCT/US2012/037284 dated Oct. 1, 2012, entitled "Headset Computer That Uses Motion and Voices to Control Information Display and Remote Devices".

International Search Report and Written Opinion for PCT/US2012/068686, date of mailing Mar. 25, 2013; entitled Wireless Hands-Free Computing Head Mounted Video Eyewear For Local/Remote Diagnosis And Repair, 11 pages.

International Search Report and Written Opinion for PCT/US2013/065927 dated Mar. 21, 2014, entitled, "Improved Headset Computer Operation Using Vehicle Sensor Feedback for Remote Control Vehicle."

(56) References Cited

OTHER PUBLICATIONS

International Preliminary Report on Patentability and Written Opinion for PCT/US2013/065927 dated Jul. 16, 2015, entitled, "Improved Headset Computer Operation Using Vehicle Sensor Feedback for Remote Control Vehicle."

Morphew, M. E., et al., "Helmet, Mounted Displays for Unmanned Aerial Vehicle Control," Proceedings of SPIE, vol. 5442 (2004).

* cited by examiner

INTENTIONALLY BLACK

HEADSET COMPUTER THAT USES MOTION AND VOICE COMMANDS TO CONTROL INFORMATION DISPLAY AND REMOTE DEVICES

RELATED APPLICATIONS

This application is a continuation of U.S. application Ser. No. 17/516,962, filed Nov. 2, 2021, now U.S. Pat. No. 11,947,387, which is a continuation of U.S. application Ser. No. 16/748,668, filed on Jan. 21, 2020, now U.S. Pat. No. 11,237,594 B2, which is a continuation of U.S. application Ser. No. 13/468,207, filed on May 10, 2012, now U.S. Pat. No. 10,627,860, which claims the benefit of U.S. Provisional Patent Application No. 61/484,464, filed on May 10, 2011. The entire teachings of the above applications are incorporated herein by reference.

BACKGROUND

The present application relates to human/computer interfaces and more particularly to a wearable headset computer that accepts voice commands, tracks hand gestures and/or detects head movements to provide inputs to control software running within the headset computer and/or peripheral devices.

Small, portable electronic devices capable of storing and displaying large amounts of high resolution computer graphic information and video content continue to be increasingly popular. Devices such as the Apple iPhone™, Google Android™ and other smartphones represent a significant trend in convergence among mobile telephones, portable computers and digital media players (iPhone is a trademark of Apple Computer, Inc. and Android is a trademark of Google, Inc.). Although these smartphones typically include a display screen, the visual experience of a high-resolution, large format display cannot easily be replicated of because physical size limitations in the handheld form factor.

Other devices which provide improved functionality over smart phones are known by various names such as headset computers, video eyewear, head mounted displays with embedded computer processors, and the like. These devices include a frame or other support mechanism that is worn about the face and/or head, similar to a pair of eyeglasses and/or headphones. The frame houses a small, high-resolution microdisplay, optical lenses and other components needed to present an electronic image to the wearer. Circuitry in the headset computer can include display drivers, wireless interface(s), and fully functional personal computer systems. For further information regarding such headset computers, refer to corresponding patent application entitled "Handheld Wireless Display Devices Having High-Resolution Display Suitable for Use as a Mobile Internet Device", PCT International Application Number PCT/US09/38601 filed Mar. 27, 2009, the entire contents of which is hereby incorporated by reference.

Such devices are also further described in U.S. application Ser. No. 61/300,611, filed on Feb. 2, 2010, titled "Head Mounted Video Eyewear With Accessory Mount;" Ser. No. 12,774,179, filed on May 5, 2010, titled "Remote Control Of Host Application Using Motion And Voice Commands;" Ser. No. 61/176,662, filed on May 8, 2009, titled "Remote Control Of Host Application Using Tracking And Voice Commands;" Ser. No. 61/237,884, filed on Aug. 28, 2009, titled "Remote Control Of Host Application Using Motion And Voice Commands;" Ser. No. 12,008,114, filed on Jan. 8, 2008, titled "Monocular Display Device;" and Ser. No. 12,008,104, filed on Jan. 8, 2008, titled "Monocular Display Device;" the contents of each of which are incorporated by reference in their entirety.

SUMMARY

A headset computer includes a microdisplay, multiple input devices such as a head tracking accelerometer and/or camera to detect movements such as head movements, hand motions and/or gestures, and audio processing circuits to detect voice commands. These inputs provide control over and operation of an application program running within the headset computer itself and/or peripherals associated with the headset computer.

In one implementation, voice, head motion, and/or hand gesture inputs are received from sensors located within the headset computer. A field of view into a 3-D virtual space is then determined from the voice, head motion and/or hand gesture inputs. Data representing the 3-D virtual space may be maintained either by a processor local to the headset computer device and/or a remote processor. The 3-D virtual space contains data representing one or more graphical objects. The graphical objects may include various elements such as computer desktops, application windows, digital images, photographs, 3-D models or other image data. The voice, head motion, and/or hand gesture inputs may determine both the field of view and scale factor to determine a viewpoint into the 3-D virtual space. Image data selected from the 3-D virtual space determined based on the field of view and scale factor, and then presented on the microdisplay.

The hand gesture, head motion and/or voice commands can be used not only to set the field of view and scale factor but also to select which of several graphic objects within the 3-D virtual space are selected for presentation on the microdisplay, in whole or in part. Thus by using these input commands the wearer of the headset may navigate through a large format 3-D space and completely control which portions of the 3-D space are seen on the microdisplay.

The head set computer may also include a light source and camera. The spectral properties of the light source and camera can be manipulated by the input commands to provide a synthetic vision function. In particular, the scene illuminated by the light source is detected by the camera, and in turn presented on the microdisplay. The light source and camera preferably operate in invisible electromagnetic portion of the spectrum including infrared, near infrared, ultraviolet, shortwave infrared or other invisible wavelengths. In this manner, the wearer of the headset computer has the ability to view scenes in an invisible portion of the spectrum.

The voice, head motion and/or hand gestures can control an operating wavelength for the light source and the camera, intensity of emissions from the light source, sensitivity of the camera, or other aspects of presentation of the synthetic vision function on the micro display.

The light source also can be used to determine range information. In particular, the light source may emit a high precision light, such as a laser light. A reflection of the light by an object can then be detected by a camera or other sensor capable of determining a round-trip time delay for the light. The headset computer can then determine a range to one or more points in physical space. This can provide not only a range to a given object but also, for example, a distance between two objects. In a case where the distances to more than two points are determined, a volume of space can be estimated.

The headset computer can be packaged to fit headgear such as a helmet. In one implementation, the processors and other electronic components can be disposed in a first housing, a second housing may carry the microdisplay on a boom and a third housing may include a power supply. One or more signal and/or power connectors are then provided between the various housings. The housings are separately attachable and detachable from the headgear. This permits retrofitting of a headset computer to helmets or other headgear that safety, security, and military personnel are accustomed to wearing. This then eliminates the need for them to fit completely assembled headsets inside of or on top of their headgear. In certain embodiments the housing for the micro display and/or processor may include noise cancellation circuits that may assist with operations in a noisy environment such as with a rebreather apparatus.

The headset computer may also control a remote vehicle and receive and display images returned from a camera on the remote vehicle. Control commands derived from voice, head motion, and hand gesture inputs can be used as a remote control for an associated vehicle. In other embodiments, the control command can alter position and/or other operating characteristics of a camera located on the vehicle. The image information returned from the camera on the remote vehicle may be displayed on the micro display.

A wearer of the headset computer can therefore experience using the remote vehicle as if he were a miniature pilot traveling on the vehicle, operating the vehicle while having a view of the scene around the vehicle displayed on the micro display. A wireless interface between the headset computer and the vehicle can be used to detect control commands for the vehicle.

The control commands may also control apparatus that are mounted on the vehicle such as payloads and other devices to be delivered by vehicle. In certain aspects, the voice command can generate complex commands for the vehicle such as "return to base", "circle at a specific altitude", and so forth.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views.

The drawings are not necessarily to scale, emphasis instead being placed upon illustrating various embodiments.

DETAILED DESCRIPTION

Figure 1:
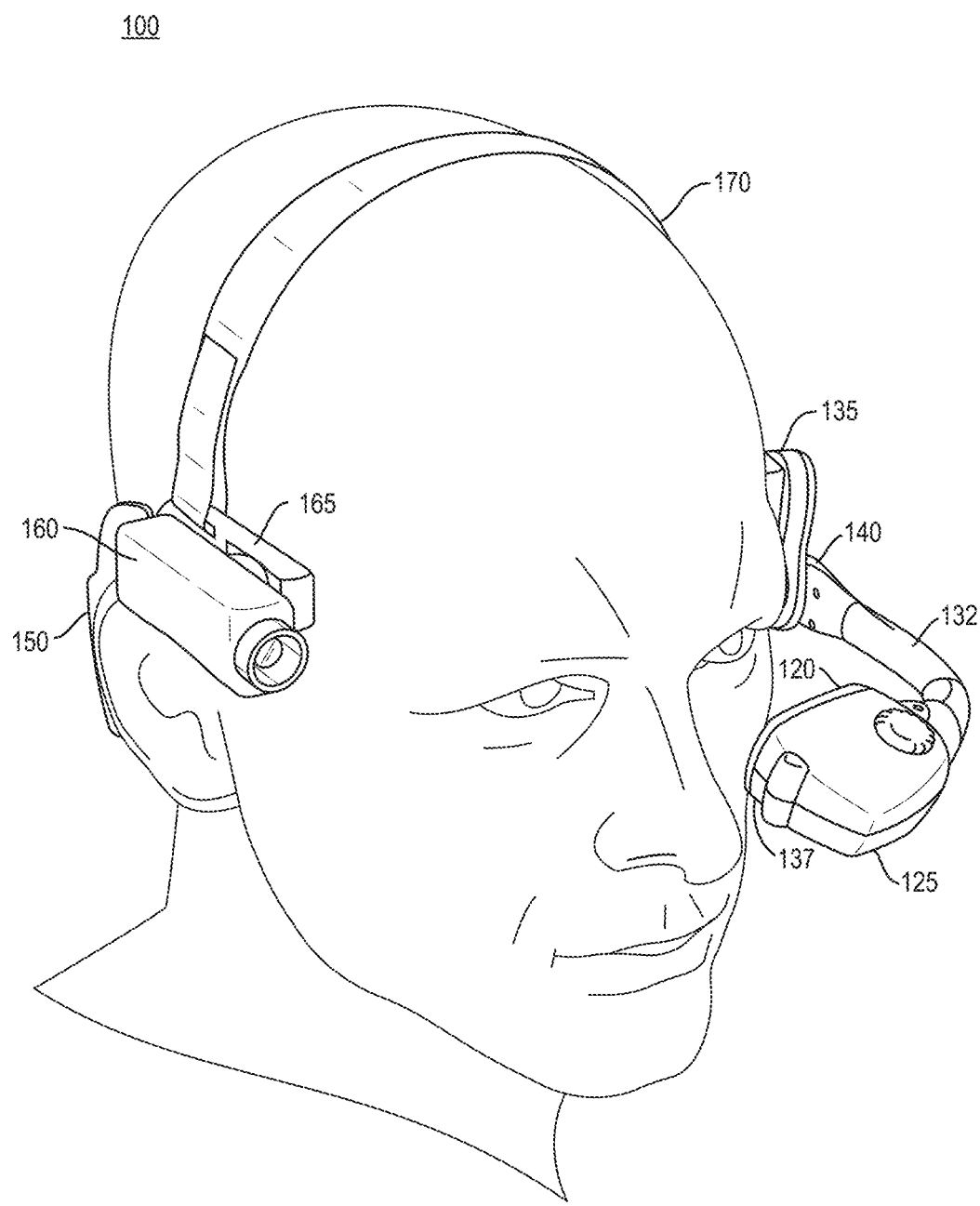
FIG. 1 shows a headset computer that implements several functions described herein.

FIG. 1 illustrates a headset computer 100 that is worn on the head of a person. The headset computer 100 is also known as video eyewear, head mounted display (HMD) with embedded computer, and by various other names. In this example, the headset computer 100 consists of apparatus, processor(s), and software that control the presentation of objects on microdisplay 120 and peripheral devices. The microdisplay 120 may be enclosed in a display housing 125 supported by a boom 132 that attaches to a frame 140. The frame 140 may additionally contain a housing 150 to enclose further electronic components; in the example shown here the housing 150 is positioned on the back of the wearer's head. One or more speakers 135 deliver audio signals to the wearer's ears and similarly one or more microphones 137 either contained in the housing 125 and/or in other areas detect audio signals. A peripheral such as a camera 160 may be attached to a peripheral port 165. The headset computer 100 may be further supported, for example, by a strap 170 on the wearer's head.

As will be explained in detail below in connection with FIGS. 9, 10 and 11, the headset computer 100 is a completely contained personal computer system including one or more data processor(s) for generating images on the microdisplay 120 and performing other functions. The processor(s) located in the headset computer 100 are capable of interpreting voice commands, detecting hand movements of the wearer (such as through the camera) 160 and/or detecting the wearer's head movements through accelerometers or other motion sensors. These inputs are then interpreted as commands to either the headset computer 100 and/or remote devices with which the headset computer can communicate, such as over wireless interfaces.

Viewport into 3-D Virtual Space

One function performed by the headset computer 100 is to provide a graphical viewport and/or window into a 3-D virtual space. The graphical viewpoint determines which information is presented on the microdisplay 120. In this mode, for example, a movement by the wearer's head can bring a different section of that 3-D virtual space into view on the microdisplay 120.

Figure 2:
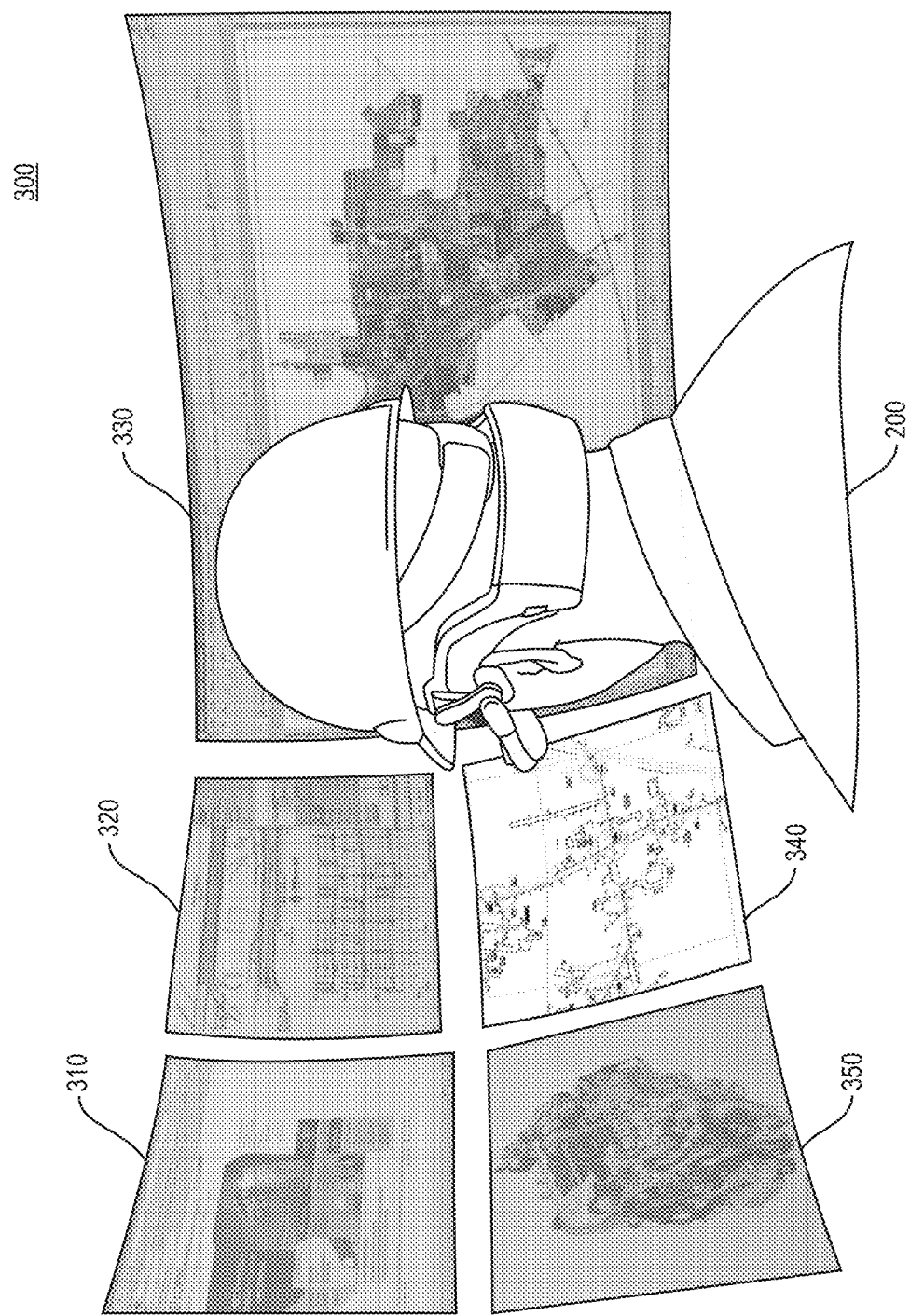
FIG. 2 depicts a viewport into a 3-D virtual space that may be manipulated with voice, head motions, or hand gestures.

FIG. 2 illustrates this in some detail. Here the wearer 200 is shown relative to the virtual 3-D space 300. The virtual 3-D space 300 has a number of windows 310, 320, 330, 340, 350 located within it and maintained by the processor(s) within the headset computer 100 or the external host. However, only a single one of the windows 340 is shown without shading, to indicate that it is an active window. The other windows 310, 320, 330 and 350 are shown grayed out. Thus while these other windows exist in the 3-D virtual space, the wearer 200 does not see the entire 3-D virtual space—rather the user 200 sees only the window 340 (or more typically, a selected portion thereof) on the microdisplay 120. The window 340 may be simply a viewport into for example, a graphic window in a windowed operating system. In the example shown here, the graphical object is a digital map image and the wearer is viewing only a portion of the map and not the whole map.

It will be understood that the 3-D virtual space may include various elements such as computer desktops, application windows, photographs, 3-D object models or any other type of digital image objects. It should be further understood that these image objects can be positioned next to, overlaid on or behind or beside one another in the 3-D virtual space.

The user can manipulate the various image objects by giving commands using the headset computer 100. In one example, the user can ask for a level of enlargement of a particular area of interest within one of the objects. The location and size of the window area may be selected by the tracking of head motions, voice commands and/or hand gestures. For example, the user may specify a position and magnification and/or zoom level to be applied to a particular application software window. The result is similar to using a magnifying glass to look at something seamlessly over a large area, but by using the head tracker/gesture detector/voice input detection to zoom into an area being seen on the microdisplay 120 and at what level of magnification. Thus, using this feature the user can move his head left, right, up or down and then select a particular one of the image objects 300, 310, 320 through 340 to be active. In one example, the user 200 might from the position shown in FIG. 2, turn his head to the right. This motion would then cause a new window 330 to then become the active window, with window 340 then becoming deactivated.

The user 200 can also issue commands to retain a piece of a large image that he wishes to magnify, freezing that portion on the screen and setting it aside and then going back and looking at another area of that image or even requesting another level of magnification for that other area. In this way, the user can view the same portions of an image at different levels of magnification and/or view different bits or pieces of a larger image at different levels of magnification and then switch between them by merely moving his head left or right, up or down In yet another example, the wearer may issue voice commands to manipulate the position of the various image objects in the 3-D virtual space. For example, he may select an image object such as by moving his head, but then issue a voice command such as to "move object up" or "move object A behind object B". This causes the head tracker to then control the relative position of the selected image object(s) within the 3-D virtual space, rather than allowing him to navigate among a given single object within the 3-D space.

It will be understood that the wearer 200 thus has access to a virtual desktop that is in any form factor that can be represented in a 3-D virtual space, i.e. he may be working in a 360° surface that wraps around his head or may be given the impression that he is working in a 3-D space with a long depth of field.

In another example, the user 200 may turn his head to the lower left causing the window 350 to become active. This window may be a 3-D model of an object such as an engine. The user may then proceed to manipulate this 3-D model using voice, head tracking and/or hand gesture commands to manipulate the viewpoint in 3-D space. The wearer may also issue a command to manipulate the model itself, such as to say, "rotate object 90° horizontal" causing the representation of the motor to rotate in 3-D space.

The view of the displayed image on the microdisplay 120 does not require the user to be physically oriented as if he were looking in any particular direction. For example, the user may remotely view any image being virtually generated in a sitting or standing position as might be projected on a wall in a room, but yet that wearer may be himself physically oriented in other positions such as laying down.

Hands-Free Synthetic Vision

Figure 3B:
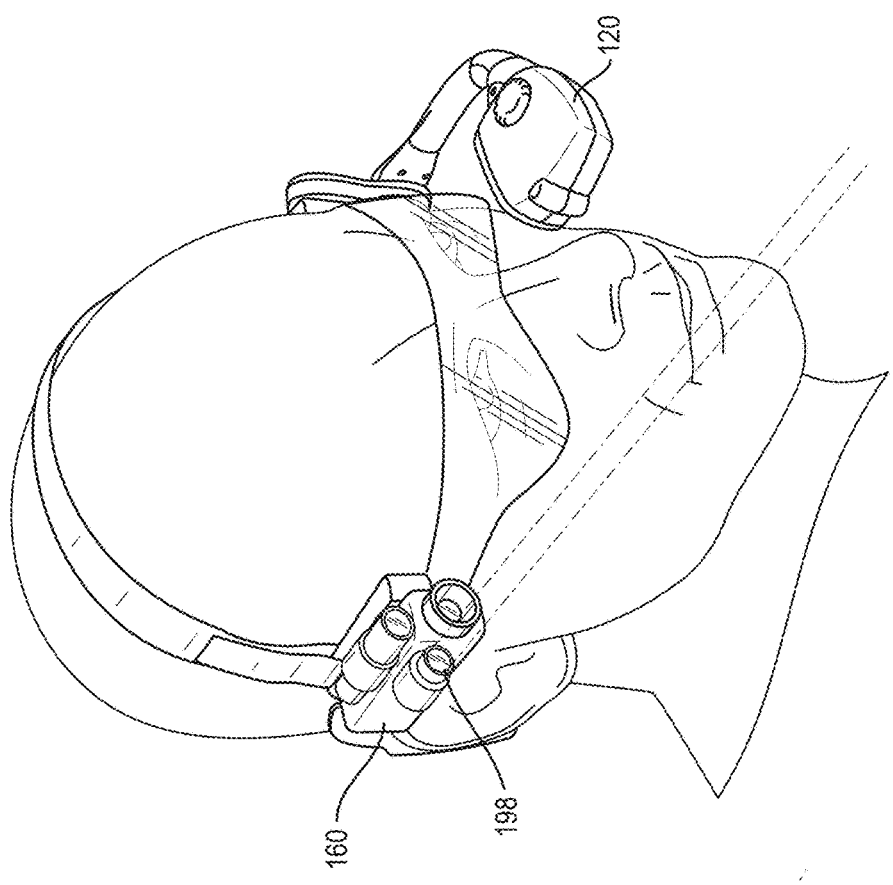
FIGS. 3A and 3B depict a synthetic enhanced vision mode and range finding mode.
Figure 3A:
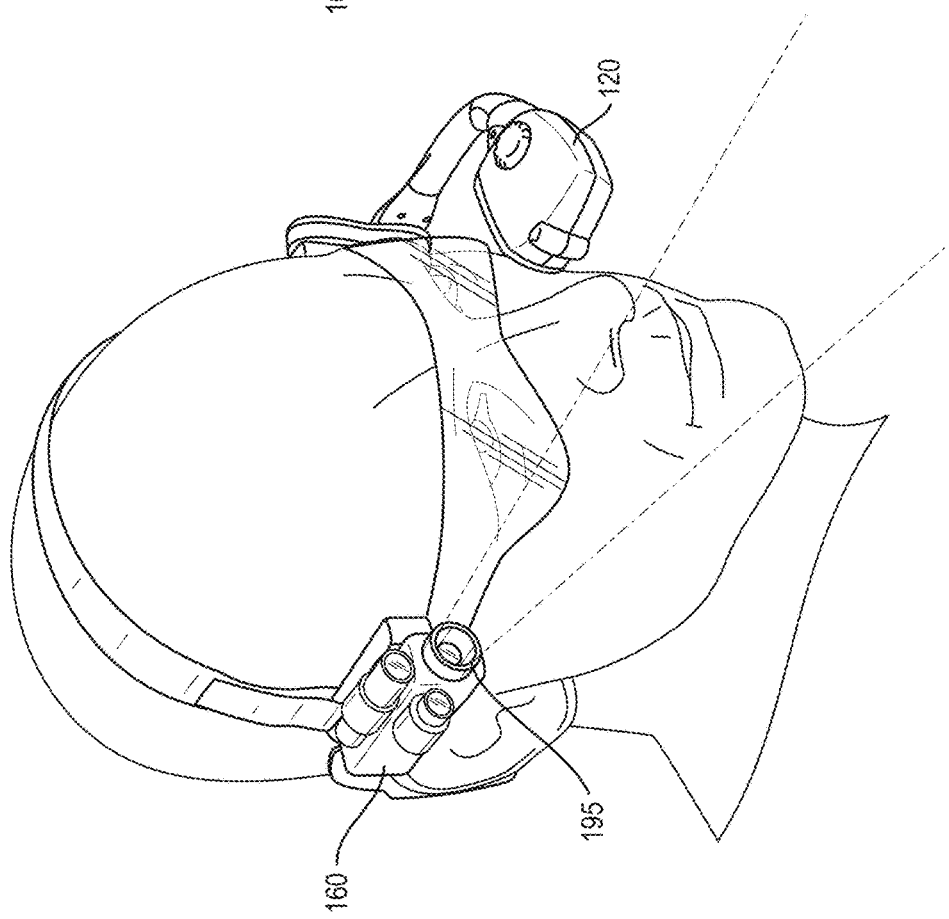

FIGS. 3A and 3B illustrate other modes and functions provided by the headset computer 100. In this example, an emitter such as a light source 195 is located within the headset computer 100 typically within the same small housing as the camera 160. If the wavelength of the camera 1600 and light source 195 are coordinated such that the camera is sensitive at the same wavelength emitted by the light source (s) then a synthetic vision function can result. For example, the light source may be infrared or ultraviolet, and if the camera is similarly sensitive in these wavelength regions, the resulting image from the camera can be seen on to the microdisplay 120. The processor in headset computer 100 can also cause not just the image to be captured by the camera and directly viewed on the microdisplay 120, but to also be stored in memory and/or be sent to a remote system or display.

Figure 4B:
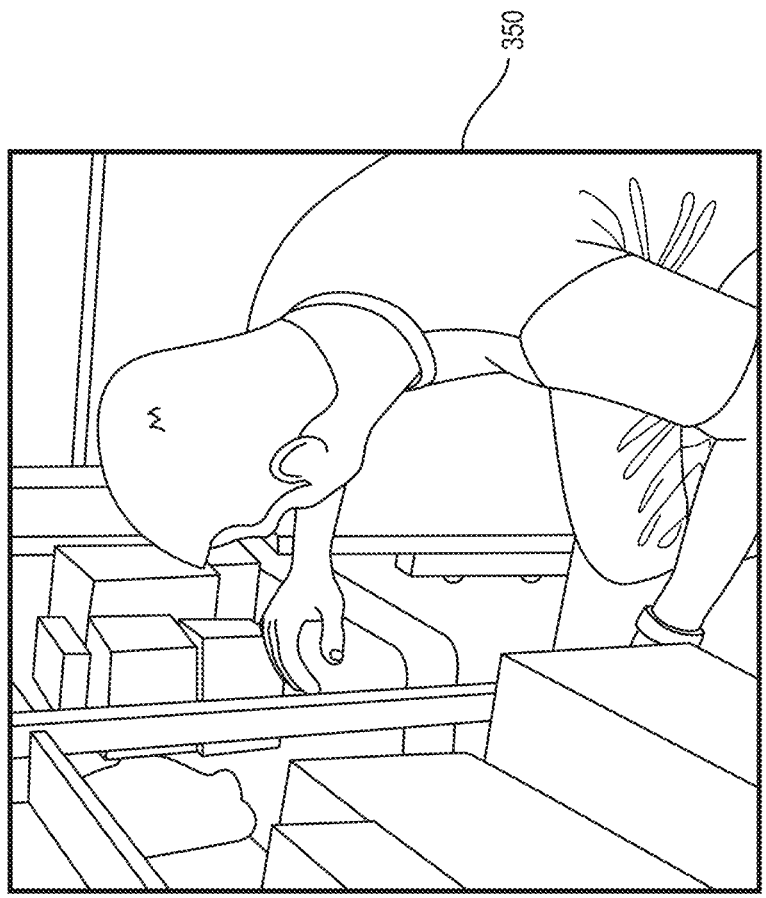
FIGS. 4A and 4B illustrate the synthetic vision mode in more detail, with FIG. 4A being a black screen seen with the light source off, and FIG. 4B a scene that is in view when the light source is enabled.
Figure 4A:
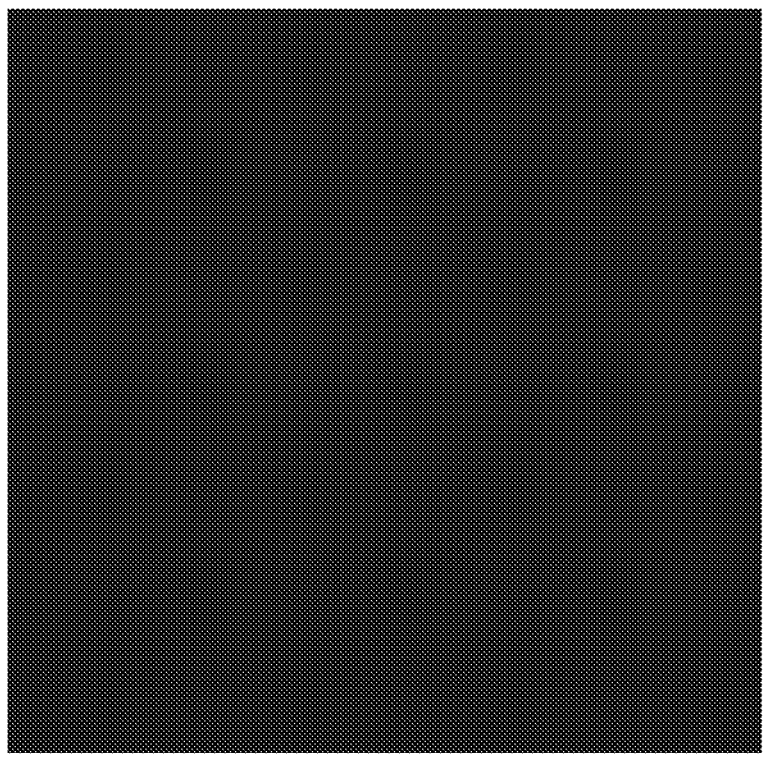

Using the headset computer 100, the wearer can thus experience hands-free synthetic vision that combines a synthetic view that is, for example, a far infrared view showing heat signatures of individuals or objects on the other side of a wall or other obstruction. An example of the same is shown in FIGS. 4A and 4B. With the light source 195 off, the image on the microdisplay is completely blank. However, with the light source 195 on, the infrared camera picks up the emission of the infrared and see an image that would not otherwise be visible. Using the headset computer 100, with an integrated infrared light source and camera, the wearer is then able to see what is in the dark environment on the microdisplay 120, but himself remain unseen by those relying only on natural non-enhanced sight. The individual 350 in the scene would not be able to detect the wearer's presence, because the infrared illumination from the light source would not be visible to the unaided eye.

As shown in FIG. 3B, the light source may also include a laser range finder 198. The laser 198 can be aimed by the user either by moving his head and/or by using voice commands. The range finder can be used for various functions such as finding the distance to an object in physical space, determining relative distance between two things. In the latter example, the user may aim his head at one object and measure a distance to that first object, and then move his head to otherwise aim the laser at second object. The user can then ask the headset computer 100 to solve the triangulation equation between his position and the two objects, thereby estimating a distance between the two objects.

In a further example, a volume of space can be estimated by the wearer aiming the laser at three or more points and asking the headset computer to figure out the distances between them. These functions can be useful in uses such as surveying or material estimating necessary. This can now be accomplished without the wearer actually moving about or by using measuring implements other than the laser range finder as built into the headset computer 100.

Components Retrofittable to Helmet

Figure 5B:
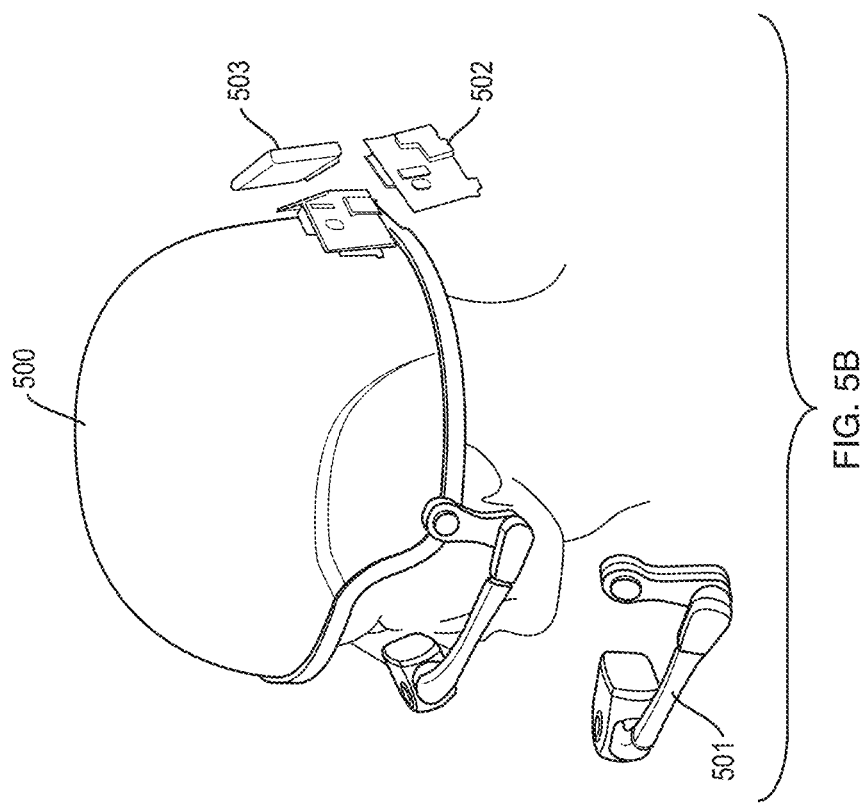
FIGS. 5A and 5B illustrate an implementation where components of the headset computer are individually attached to a helmet.
Figure 5A:
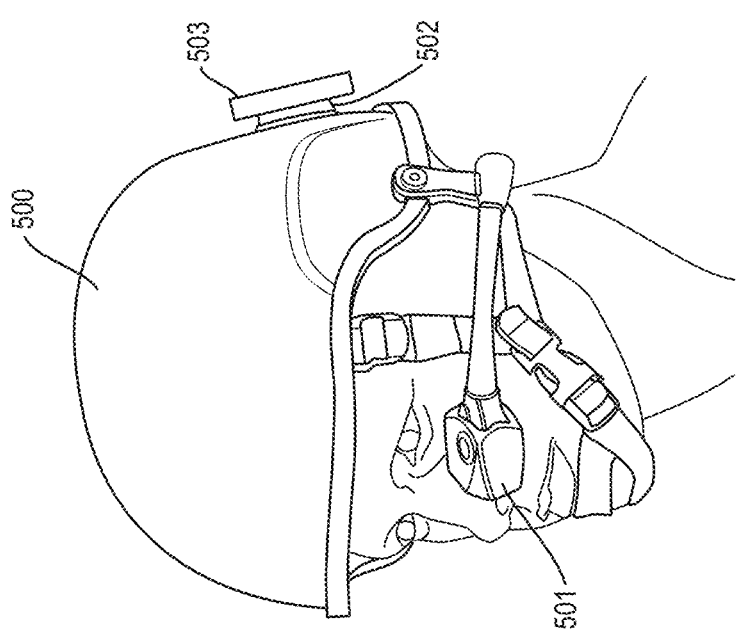

FIGS. 5A and 5B illustrate another example of the headset computer 100 packaged in a particular way to be retrofit onto existing headgear. In this implementation, headset computer electronics (including peripheral devices such as a camera and battery power source), the main processor and so forth may be packaged into one component housing 502, and the boom with an integrated optical/visual/audio part packaged as another component housing 501. The components 501, 502 are individually attachable to an existing headgear familiar to the user. In this example shown, a helmet 500 may have two Velcro™ pads, with the electronics component 502 attached to one pad Velcro™, and a battery 503 separately packaged and attached to the other Velcro™ pad (Velcro is a trademark of the Velcro Corporation). The boom element 501 is also attached to the helmet, such as via a mechanical clip or fastener; the boom of course including the integrated microdisplay and microphones. A cabling system can connect the microdisplay and boom 501 to the electronics 502 and battery 503. The boom 501 may be fixed and/or bolted to the left side or right side of the helmet, depending on user preference and also depending upon other equipment that the user may be operating.

Camera(s), laser(s), and other peripherals can also be mounted to the helmet 500. Instead of requiring the wearer to wear a dedicated headset under the helmet, this packaging approach can implement a headset computer functionality without the user having to become comfortable with new headgear. In addition, operation with certain types of headgear (such as a rebreather) is not affected. This particular end use may be improved if the on board electronics also provide for noise cancellation. For example, if the wearer is using a rebreather, the rebreather tends to make a lot of background noise that would otherwise interfere with voice inputs or sound recording. The on-board electronics may include noise cancellation circuits or programming that eliminate the background noise of the rebreather. A similar approach can be used to cancel out other background noises to allow for clearer recording of voices or other sounds.

Headset Computer Controls Remote Vehicle, Receives and Displays Images from and to the Remote Vehicle In yet another implementation, the voice, head motion and/or hand gesture inputs received from the sensors located within the headset computer 100 can be used to derive a remote control command. That control command can then be sent over a wireless interface to control a remote vehicle robot, or other object. In this end use, the input device may also further include a wireless joystick and/or mouse to provide further inputs to control the vehicle.

In one example, a voice input to the headset computer can generate a control command to control the path of the vehicle. Voice commands, such as "turn right", "turn left", "move forward", "move backward", "stop" and so forth can be included in the processing capabilities of the headset computer 100. Similarly, head tracking inputs can generate a control command to control the path of the vehicle, or more commonly the direction of the camera on the vehicle. In this way, the user can obtain an experience that he is physically located on the vehicle. This is accomplished by having the camera on the vehicle transmitting video preferably wirelessly back to the headset computer. The video received at the remote vehicle can then be displayed on the display within the headset computer.

Figure 6:
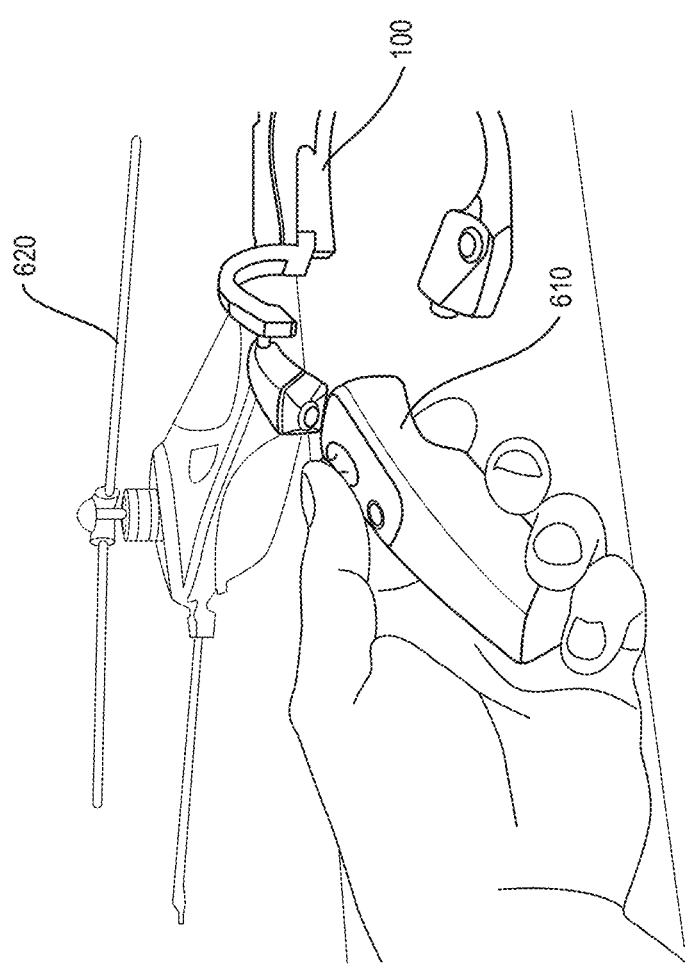
FIG. 6 illustrates a wireless joystick and mouse controller that can be used with the headset computer to control another device such as a vehicle.

In yet another example, a wireless handheld controller 610 such as that shown in FIG. 6 can be used with the headset computer 100 to control the path position, attitude and/or direction of the vehicle 620 more naturally.

Figure 7A:
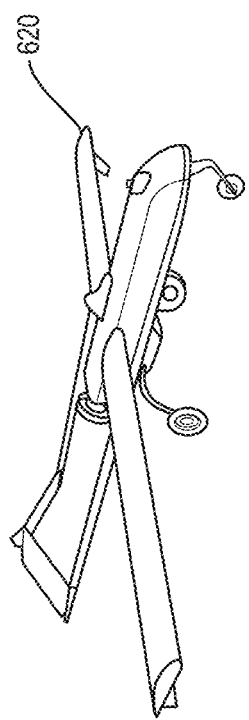
FIGS. 7A, 7B and 7C illustrate more examples of vehicles that can be controlled by the headset computer operating components contained thereon.
Figure 7B:
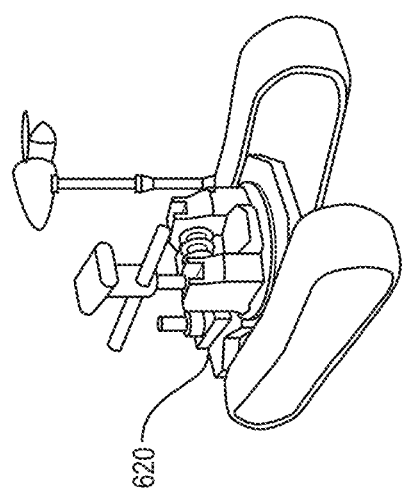
Figure 7C:
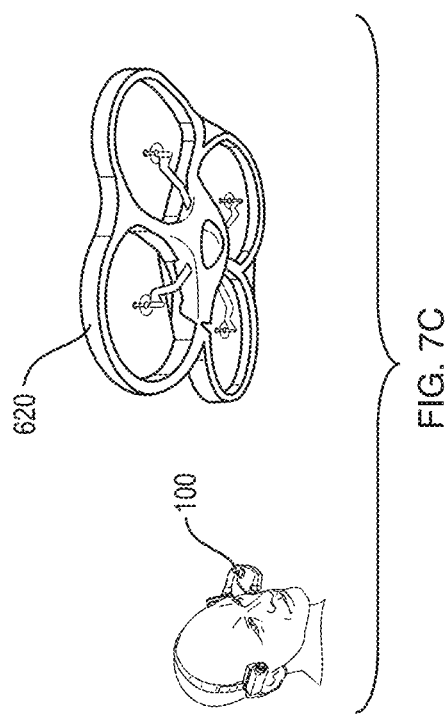

Using this arrangement, a person can control a vehicle such as an unmanned aerial vehicle (FIG. 7A), unmanned ground vehicle (FIG. 7B) or a toy (FIG. 7C) and so forth. This eliminates problems with prior art that simply operates a remote vehicle 620 with a videogame type of controller that requires almost total user attention and both hands to operate. By utilizing wireless joystick controller 610 in combination with the wearable headset computer 100 that can obtain head motion, voice and hand tracking commands, the control and electronic processing capabilities of the headset computer can give anyone control such as a soldier, policeman, fire or industrial worker control over one or more remote systems or vehicles 620 in simple and natural way.

In the absence of a separate user input device, the camera on the headset computer 100 may detect the user's hand gestures as control inputs. The wearer can also give speech commands to give the vehicle certain commands. For example, if the wearer says "freeze", that can be detected by the headset computer which then translates the spoken command into one or more commands to control the flight path of the unmanned aerial vehicle, to stop doing everything else and simply hover or follow a circular flight path around a current point of interest.

In other examples a voice command such as "return to base" can cause the vehicle to follow a complex programmed flight path. Another example can be "circle at a specific altitude" which can cause the vehicle to generally follow a geo-stable circle around its present location. This can alleviate the user from tediously having to continuously provide commands via the handheld controller.

Other voice commands and hand held commands can be used to control other aspects of the vehicle's capabilities, performance and/or path of travel.

In one embodiment, the vehicle 620 may itself contain a camera that transmits its video output wirelessly back to the headset computer 100. Video carried back to the headset computer 100 is then displayed on the microdisplay 120. The wearer's head movements and/or gestures may then be used in a natural way to control the position, attitude, pan, zoom, magnification, light spectral sensitivities or other capabilities of the camera on the remote vehicle. The user's head movements can then be tracked by the on board electronics of the headset computer 100 and translated by the headset computer into commands that are sent back to aim the camera of the unmanned vehicle. As an example, if the wearer looks to the left, that motion is detected by the head tracker in the headset computer, translated into a camera "move left" command. That "move left" command is then sent wirelessly to the remote vehicle, causing the camera on the remote vehicle to pan to the left.

By returning the video stream back from the vehicle and displaying it on the microdisplay gives the wearer a visual experience as if he were, for example, a miniature pilot inside an unmanned aerial vehicle.

Figure 8:
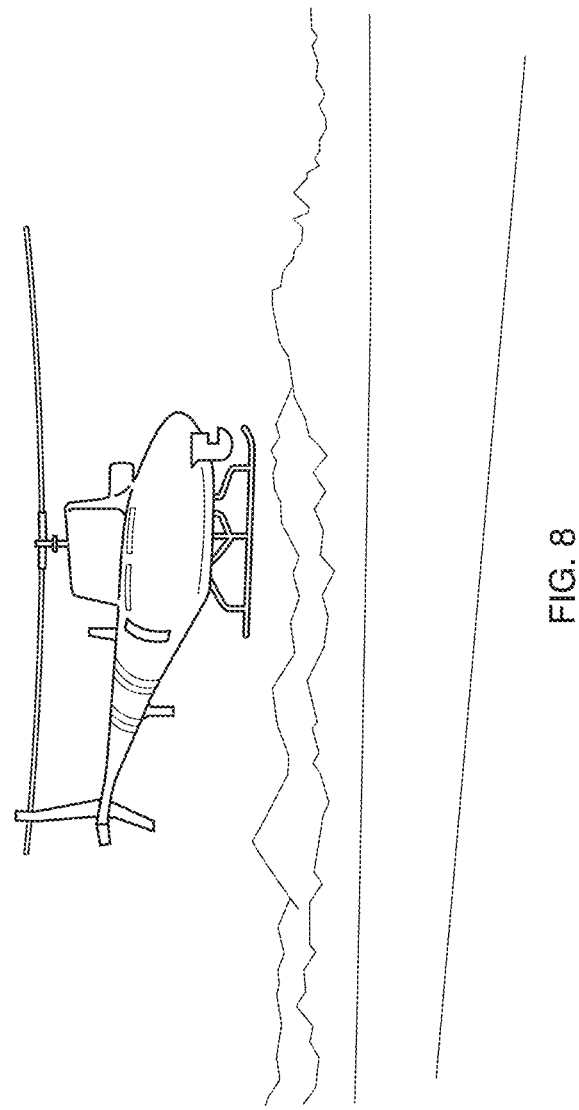
FIG. 8 shows a wireless joystick used with the headset computer.

In yet another function, the user can, for example, use speech commands to control other peripherals that the vehicle itself might contain. An unmanned aerial vehicle such as shown in FIG. 8, may carry a payload such as a camera or other sensor to be dropped at a remote location. These payloads, weapons or other objects that the vehicle is capable of delivering can be controlled by the user of the headset computer 100. Control over these payloads can be implemented regardless of what the vehicle itself is being commanded to do.

System Description

Figure 9:
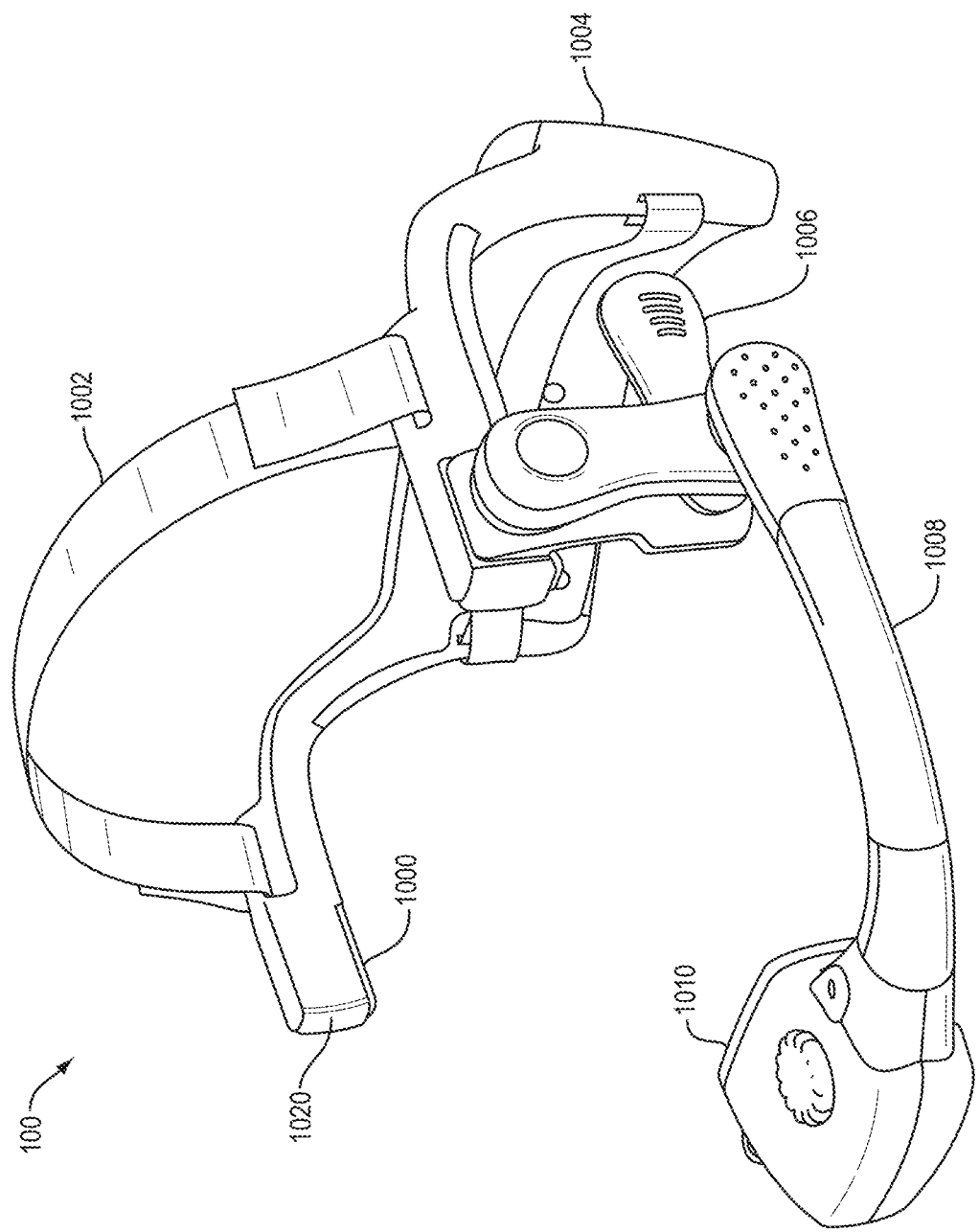
FIG. 9 is a more detailed view of the headset computer.

FIG. 9 shows a wireless headset computer 100 (also referred to as a video eyewear device 100) that incorporates a high resolution (VGA or better) microdisplay element and other features described below. Headset computer 100 typically includes many different types of integrated circuits including a microprocessor (single or multi-core), one or more wireless interfaces, associated memory or other storage devices, one or more cameras (optical sensors) and/or various sensors. These sensors may include audio input and/or output devices, such as one or more microphone(s) input and output speaker(s) the sensors may include geo-positional sensing, 3 axis to 9 axis degrees of freedom orientational sensors (such as a digital magnetometer), atmospheric sensors, health condition sensors, GPS, digital compass, pressure sensors, environmental sensors, energy sensors, acceleration, position, attitude, motion, velocity or optical sensors, and cameras (visible, infrared, etc.). Further circuits such as additional wireless radios, auxiliary lighting, range finders, or the like, and/or an array of sensors may be embedded in and/or attached to the device. Also typically located within the device 100 are a peripheral mount or mounts such as a "hot shoe" (not shown in FIG. 9) for mounting optional accessories such as cameras or additional sensors. The camera(s), motion sensor(s) and/or sensor(s) are used to track the motion and/or position of the user's head, hands and/or body in at least a first axis 111 (horizontal), but preferably also a second (vertical), a third (depth), a fourth (pitch), a fifth (roll) and a sixth (yaw).

The headset computer device 100 can be used in various ways. It can be used as a completely contained, head-mounted fully functional portable personal computer/smart phone with full connectivity to external computers and networks through a short and/or long-range wireless links such as Bluetooth, WiFi, cellular, LTE, WiMax or other wireless radios.

Device 100 can be also used as a remote display for a streaming video signal provided by a remote host computer. The host may be, for example, a laptop, cell phone, Blackberry, iPhone™, or other computing device having lesser or greater computational complexity than the device 100 itself. The host then provides information to the device 100 to be displayed. The device 100 and host are connected via one or more suitable wireless connections such as provided by the Bluetooth WiFi, cellular, LTE, WiMax or other wireless radio link. The host may itself be further connected to other networks such as through a wired or wireless connection to the Internet.

While what is shown in FIG. 9 is a monocular microdisplay presenting a single fixed display element supported on the face of the user with a cantilevered boom, it should be understood that other mechanical configurations for various video eyewear devices 100 are possible.

In the FIG. 9 implementation, headset computer 100 includes generally a frame 1000, a strap 1002, a back section 1004, speaker 1006, cantilever or arm 1008, and microdisplay subassembly 1010. On one side of the device 100 opposite the cantilever arm 1008 is a peripheral port 1020. The peripheral port 1020 provides corresponding connections to one or more peripheral devices, so a user can removably attach various accessories to the device 100. As an example port 1020 provides a mechanical and electrical accessory mount such as a hot shoe. Wiring carries electrical signals from port 1020 through, for example, the back portion 1004 to circuitry disposed therein. Hot shoe 1020 can operate much like the hot shoe on a camera, automatically providing connections to power the accessory and carry signals to and from the rest of device 100. Various types of accessories can thus be used with port 1020 to provide the hand movements, head movements, and or vocal inputs to the system, such as but not limited to microphones, positional, orientation and other previously described sensors, cameras, and the like.

FIG. 1 was a view of the headset computer 100 as worn on the head of a user where an accessory 1060 has been placed in the hot shoe port 1020. This accessory 1060 is a self-contained camera (or other motion sensor) assembly. The camera 1060 can include both audio and video sensing, recording, and light emission capabilities in a package similar to a "bullet cam". It can be connected to the remaining components in device 100 via built in wiring in the back section 1004 (as in the case of the speaker previously described) or can be wirelessly connected via a Bluetooth™ or WiFi™ connection. The camera 1060 may not necessarily be a video camera, but may also detect infrared, ultraviolet, or other wavelengths. The camera 1060 can also include a user adjustable auxiliary light source. With the light source, the camera 1060 can also be used as a light source as desired without activating the camera portion.

The camera, motion tracking and audio inputs to the device 100 are interpreted as user commands in various ways to control operation of the local processor, the microdisplay, or the external host.

Head movement tracking and/or vocal commands can also be provided by the user 1050 to manipulate the settings of camera 1060. For example, a user vocal command, such as "zoom" or "pan", can be recognized by the local processor and cause the camera 1060 to zoom in or telephoto out.

Figure 10:
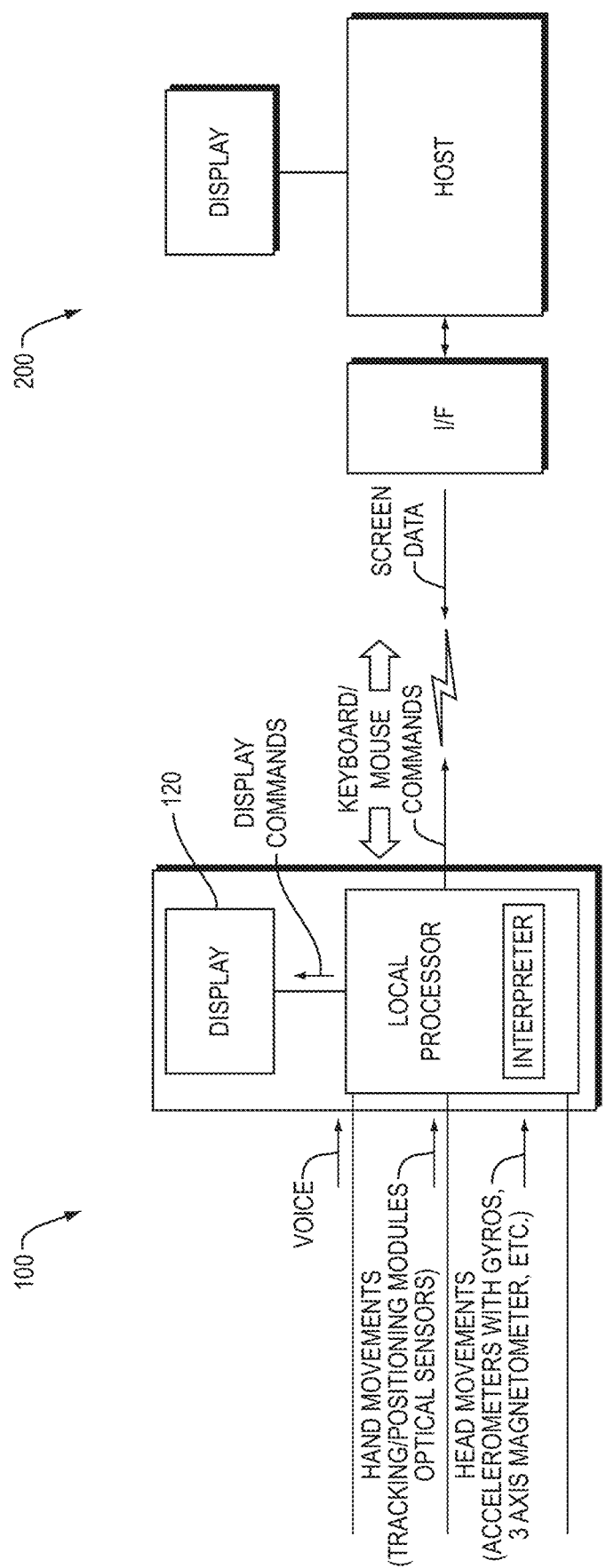
FIG. 10 is a high-level block diagram of the functions performed by the headset computer.

FIG. 10 is a block diagram showing more detail of the device 100, optional host 200 and the data that travels between them. The device 100 receives audio signals input via the microphone, hand movements or body gestures via positional and orientation sensors, the camera or optical sensor(s), and head movement inputs via the head tracking circuitry such 3 axis to 9 axis degree of freedom orientation sensors. These are translated by software in a processor local to the device 100 into commands. These commands may then be interpreted by a processor internal to the device 100 to control aspects of the presentation of information on the microdisplay or other objects such as a peripheral or remote vehicle. The commands may also be sent over the Bluetooth or other wireless interface 150 to the host 200. The host 200 then interprets these translated commands in accordance with its own operating system/application software to perform various functions, and or returns information to the device 100. In one example, the device 100 and/or host 200 maintain a 3-D virtual space into what graphic objects are stored.

Among the commands that can be carried out on the local processor and/or the remote host 200 is one to select a field of view 300 within the virtual display. Thus, it should be understood that a very large format virtual display area might be associated with operating system or application software running on the device 100 or on the host 200. However, only a portion of that large virtual display area within the field of view is returned to and actually displayed by the remote control display device 120 as selected by the voice, hand gestures, or head motion commands.

Figure 11:
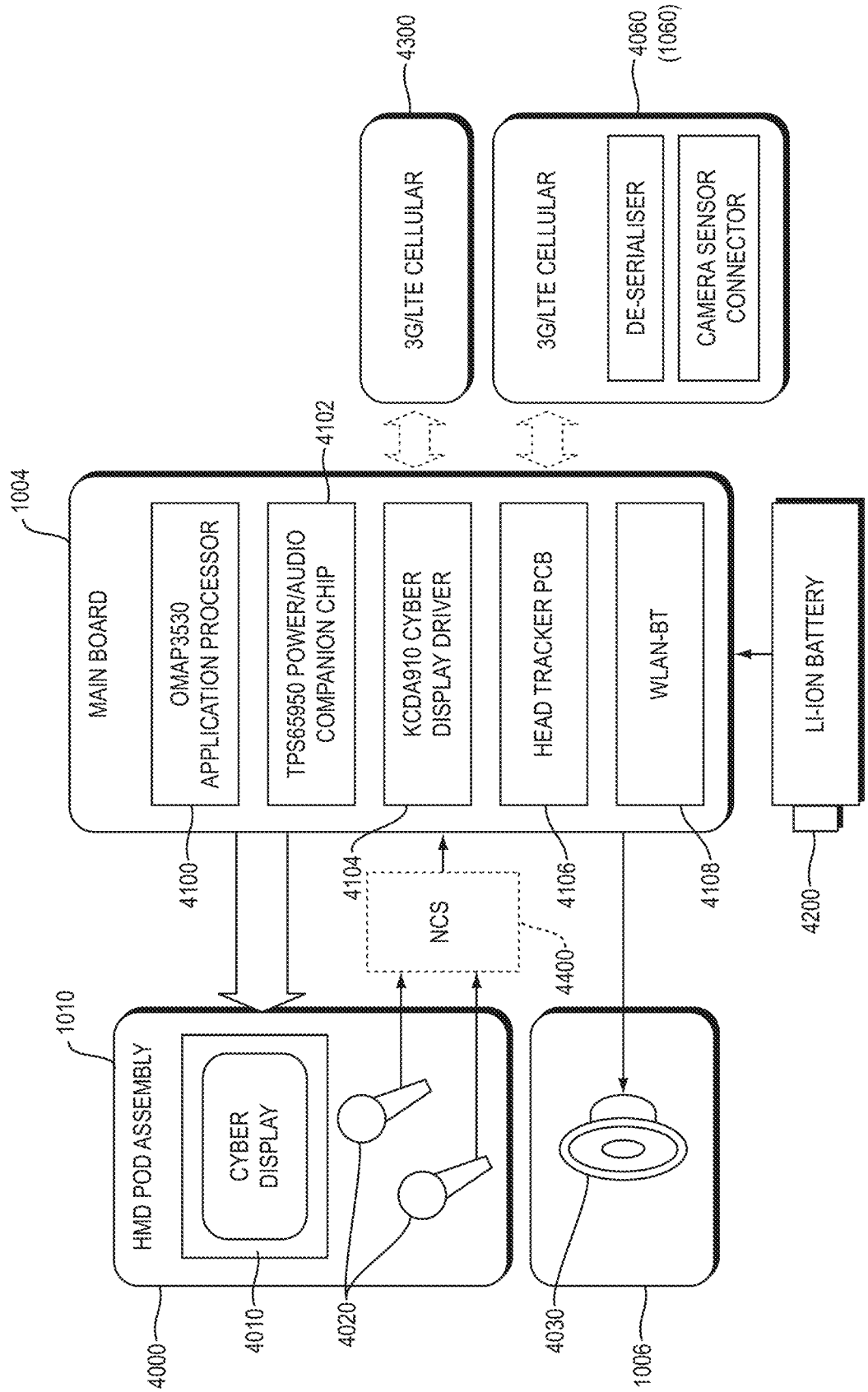
FIG. 11 is a more detailed block diagram of the components of the headset computer.

FIG. 11 is a simplified high level block diagram of a non-limiting example embodiment of the headset computer device 100. The system electronics can be placed on or in the frame in an appropriate location (such as back section 1004) and include an Open Media Application Platform (OMAP) as the local processor 4110, a power/audio companion chip 4102, a display driver 4104, a head tracker circuit board 4106, and wireless LAN/Bluetooth interface 4108. Also located in the housing is a power source, such as a lithium ion battery 4200.

The device 100 may also include an eye pod assembly 4000 that includes the aforementioned microdisplay 4010 (e.g. the microdisplay 1010 and boom 1008 of FIG. 2A), and one or more microphones 4020. One or more speakers 4030 are positioned in the HMD housing earpiece near the user's ear (item 1006 in FIG. 9). The head tracker circuitry 4106 may include circuits to determine head movements and gestures detected by sensors in the device 100, such as lateral movements along and rotation gestures around the X, Y and Z axes using Hall effect sensors, MIM diodes, accelerometers, gyros and/or transducers or other sensors as mentioned above.

Device system 100 may also receive inputs from external input devices such as a wireless mouse, track ball, or keyboard that may be wirelessly connected through the Bluetooth interface 4108.

Software in the WLAN/BT front end 4108, the OMAP 4100 and/or host 200 may be used to interpret hand gestures detected by the camera or other sensors. A camera board 4060 may optionally provide video input, as well.

The OMAP processor 4100 may include a central processing unit, and on-chip memory such as Random Access Memory (RAM) that may include non volatile memory and/or Read Only Memory (ROM). The OMAP may be a Texas Instruments model OMAP 3530 processor or newer version sold by Texas Instruments, Inc. and using a multimedia processor. The OMAP 4100 may typically execute an embedded system such as operating a particular version of MicroSoft Windows®. The OMAP 4100 is generally a more powerful, and more power consuming processor than the WLAN/BT interface 4108.

In this example, a TPS 65950 power/audio companion chip, also available from Texas Instruments, provides audio, USB, keypad control and battery charging functions to the system.

The WLAN/BT interface 4108 may be a model LBEE 1W8 NEC-interface circuit, a Bluetooth circuit such as available from CSR, Ltd. of Cambridge, United Kingdom or other radio module with similar or greater capabilities.

The display driver may be a model KCD-A 910 display driver available from Kopin Corporation of Westborough, Massachusetts.

The microdisplay 4010, also available from Kopin, can include models CyberDisplay 230K, WQVGA, VGA, WVGA, SVGA or other manufactures' acceptable microdisplays.

An NCS module 4400 takes raw microphone signal data as input, and outputs audio data with background noise removed. It produces an audio signal to the audio companion chip 4102 and from there to the OMAP processor 4100. Voice recognition is performed in software on the OMAP processor 4100, using the cleaned up microphone signals as fed in by the NCS 4400.

The teachings of all patents, published applications and references cited herein are incorporated by reference in their entirety.

While this disclosure has described several example embodiments, it will be understood by those skilled in the art that various changes in form and details may be made therein without departing from the scope of the invention encompassed by the appended claims.

What is claimed is:

1. A headset computer device, comprising:
   at least one processor;
   at least one sensor located within the headset computer device;
   a light source located within the headset computer device, the at least one processor configured to operate the light source according to voice, head motion, and/or hand gesture input(s) detected by the at least one sensor, the light source configured to emit light away from the headset computer device and into an external environment to be synthetically visualized; and
   a camera located within the headset computer, the at least one processor further configured to operate the camera according to the voice, head motion, and/or hand gesture input(s) detected by the at least one sensor.

2. The headset computer device of claim 1, wherein the light source and camera are configured to operate at a non-visible wavelength.

3. The headset computer device of claim 1, wherein the light source and camera are configured to operate at an infrared (IR) or ultraviolet (UV) wavelength.

4. The headset computer device of claim 1, wherein the at least one processor is further configured to control an operating wavelength for the light source and the camera in response to the voice, head motion, and/or hand gesture input(s).

5. The headset computer device of claim 1, wherein the at least one processor is further configured to controlling an intensity of emissions from the light source in response to the voice, head motion, and/or hand gesture input(s).

6. The headset computer device of claim 1, wherein the at least one processor is further configured to control a sensitivity of the camera in response to the voice, head motion, and/or hand gesture input(s).

7. The headset computer device of claim 1, wherein the at least one processor is further configured to determine a field of view and scale factor from the voice, head motion and/or hand gesture inputs.

8. The headset computer device of claim 7, further comprising a microdisplay disposed within the headset computer device and wherein the at least one processor is further configured to:
   display image data captured by the camera on the microdisplay; and
   select an image portion to be presented on the microdisplay from the image data depending on the field of view and scale factor.

9. The headset computer device of claim 1, further comprising a microdisplay disposed within the headset computer device and wherein the at least one processor is further configured to display image data captured by the camera on the microdisplay.

10. The headset computer device of claim 9, wherein the light source is a laser range finder and wherein the image data includes range information.

11. The headset computer device of claim 1, further comprising a microdisplay and wherein the at least one processor is further configured to:
   determine range information for at least two points;
   determine distance information between the two points from the range information; and
   display the distance information on the microdisplay.

12. The headset computer device of claim 1, further comprising a microdisplay and wherein the at least one processor is further configured to:
   determine range information for multiple points:
   determine volume information for a space defined by the multiple points; and
   display the volume information on the microdisplay.

13. A headset computer device, comprising:
   at least one sensor located within the headset computer; and
   at least one processor, the at least one processor configured to:
      receive image data from a remote vehicle;
      receive voice, head motion, and/or hand gesture input(s) from the at least one sensor;
      determine a control command from the voice, head motion, and/or hand gesture inputs; and
      send the control command to the remote vehicle, wherein the control command controls a camera located on the remote vehicle.

14. The headset computer device of claim 13, further comprising microdisplay disposed within the headset computer device and wherein, in response to sending the control command, the at least one processor is further configured to:
   receive image data from the camera located on the remote vehicle; and
   present the image data on the microdisplay.

15. The headset computer device of claim 13, wherein the control command is a first control command, wherein the at least one processor is further configured to determine a second control command from the voice, head motion, and/or hand gesture inputs, and wherein the second control command is employed by the at least one processor to control operation of the remote vehicle.

16. The headset computer device of claim 13, wherein the control command is a first control command and wherein the at least one processor is further configured to generate a second control command based on a voice input and employ the second control command to control a path of the remote vehicle.

17. The headset computer device of claim 16, the at least one processor is further configured to generate a third control command based on a head motion input and to employ the third control command to control the camera on the remote vehicle.

18. The headset computer device of claim 13, wherein the control command controls position, attitude and/or direction of the camera.

19. The headset computer device of claim 13, wherein the at least one processor is further configured to:
   receive an input from a handheld controller; and
   determine a command to control a path of the remote vehicle from the handheld controller input.

20. The headset computer device of claim 13, wherein the voice input at least one processor is further configured to generate a hover command based on voice input to cause the remote vehicle and camera to remain fixed in position.

* * * * *